United States Patent
You et al.

(10) Patent No.: US 9,892,482 B2
(45) Date of Patent: Feb. 13, 2018

(54) PROCESSING VIDEO CONTENT

(71) Applicants: INTEL CORPORATION, Santa Clara, CA (US); Hua You, Shanghai (CN); Jiaping Wu, Shanghai (CN)

(72) Inventors: Hua You, Shanghai (CN); Jiaping Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,072

(22) PCT Filed: Dec. 19, 2012

(86) PCT No.: PCT/CN2012/086916
§ 371 (c)(1),
(2) Date: Jun. 26, 2013

(87) PCT Pub. No.: WO2014/094247
PCT Pub. Date: Jun. 26, 2014

(65) Prior Publication Data
US 2015/0310578 A1    Oct. 29, 2015

(51) Int. Cl.
*G09G 5/36*      (2006.01)
*G06T 1/60*      (2006.01)
(Continued)

(52) U.S. Cl.
CPC .............. *G06T 1/60* (2013.01); *G06F 9/3881* (2013.01); *G06F 9/545* (2013.01); *G06T 1/20* (2013.01)

(58) Field of Classification Search
CPC .... G09G 5/393; G09G 5/39; G09G 2340/125; G09G 5/14; G09G 5/36
(Continued)

(56) References Cited

U.S. PATENT DOCUMENTS 6,035,424 A * 3/2000 Freerksen ........... G06F 12/0897
                                              711/E12.043
8,056,093 B1 * 11/2011 McClure .................. G06T 1/20
                                              345/522
(Continued)

FOREIGN PATENT DOCUMENTS

CN       1226699 A     8/1999
CN    101025821 A     8/2007
(Continued)

OTHER PUBLICATIONS

International Search Report and Written Opinion received for PCT Patent Application No. PCT/CN2012/086916, dated Sep. 26, 2013, 11 pages.
(Continued)

*Primary Examiner* — Ke Xiao
*Assistant Examiner* — Gordon Liu
(74) *Attorney, Agent, or Firm* — Jordan IP Law, LLC (57) ABSTRACT

Technologies may provide for processing video content. A request to process video content may be received at a user mode driver. In response, the user mode driver may insert a command associated with the request into a command buffer. In addition, the user mode driver may enqueue the command buffer to receive a further request to process further video content independent of an execution of the command by platform hardware. Additionally, a command submission process may dequeue the command buffer and call a kernel mode driver. The kernel mode driver may receive the system call independent of the user mode driver and submit the command buffer to the platform hardware to process the video content.

26 Claims, 5 Drawing Sheets

(51) Int. Cl.
*G06T 1/20* (2006.01)
*G06F 9/38* (2018.01)
*G06F 9/54* (2006.01)

(58) Field of Classification Search
USPC .......................................................... 345/547
See application file for complete search history.

(56) References Cited

U.S. PATENT DOCUMENTS

| | | | |
|---|---|---|---|
| 2004/0187135 A1* | 9/2004 | Pronovost | G06F 9/4881 718/104 |
| 2006/0041859 A1 | 2/2006 | Vrancic et al. | |
| 2006/0041895 A1* | 2/2006 | Berreth | G06F 13/102 719/328 |
| 2006/0045359 A1 | 3/2006 | Chen et al. | |
| 2007/0195099 A1* | 8/2007 | Diard | G06T 1/20 345/501 |
| 2012/0084517 A1* | 4/2012 | Post | G06F 9/45541 711/153 |
| 2012/0229481 A1* | 9/2012 | McCrary | G06F 9/5044 345/522 |
| 2013/0162661 A1* | 6/2013 | Bolz | G06T 1/20 345/522 |

FOREIGN PATENT DOCUMENTS

| | | |
|---|---|---|
| CN | 101218562 A | 7/2008 |
| CN | 102707986 A | 10/2012 |

OTHER PUBLICATIONS

Wasson, "Nvidia Graphics Drivers to Go Multithreaded", The Tech Report, Jun. 20, 2005, 1 page Webpage available at: http://techreport.com/discussions/8459.

Office Action for Chinese Patent Application No. 2012800771619, dated Mar. 17, 2017, 30 pages including 17 pages of English translation.

* cited by examiner

PROCESSING VIDEO CONTENT

BACKGROUND

Embodiments generally relate to signal processing. More particularly, embodiments relate to enqueuing a command buffer including a command associated with a request to process video content via a user mode driver (UMD) to receive a further request to process further video content independent of an execution of the command by platform hardware, to dequeuing the command buffer via a process (e.g., thread), and/or to submitting the command buffer to the platform hardware via a kernel mode driver (KMD) independent of the user mode driver.

In computer applications, such as in video streaming applications, throughput is an important performance indicator that may be measured in maximum frame processing rate (e.g., in frames per second (FPS)). Driver models employed to process video content may include a user mode driver (UMD) and a kernel mode driver (KMD). For example, the UMD may receive a request to process a video frame from an upper level component, locate hardware commands and a command buffer, and make a direct system call to the KMD to submit the command buffer to platform hardware to process the video frame. The UMD waits, and does not return to the upper level component to receive further requests, until the platform hardware finishes execution. Accordingly, the dependence of the UMD on the KMD and/or on the platform hardware execution may be a performance block for throughput (e.g., FPS), for example when the bit rate is relatively high (e.g., above approximately 30 Mbps) and may lead to unnecessary waste of resources, such processor utilization, power utilization, and/or may negatively impact user experience.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
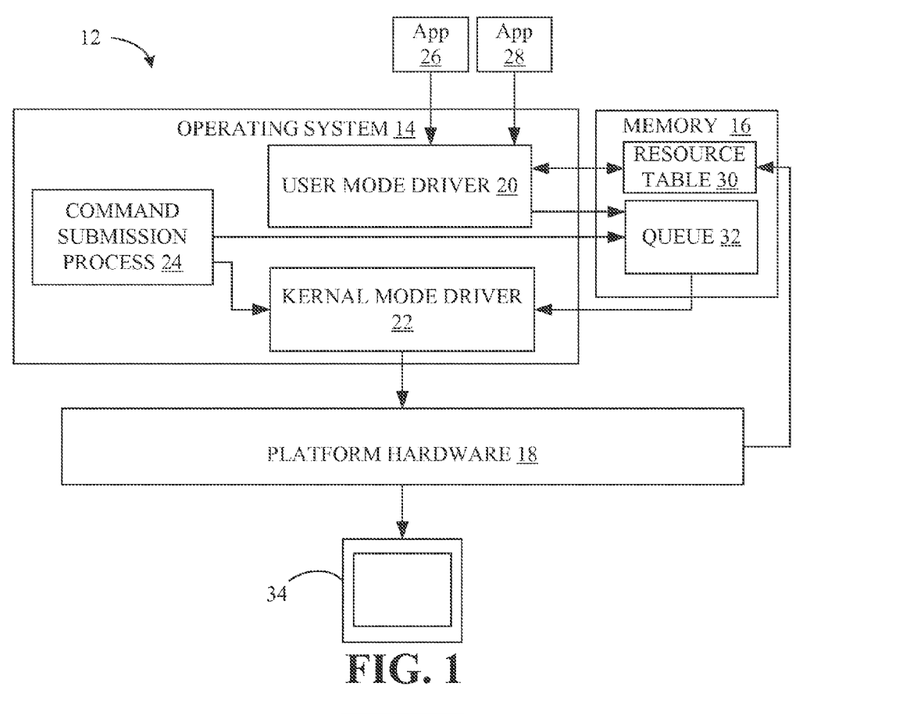
FIG. 1 is a block diagram of an example of an apparatus to process video content according to an embodiment.

FIG. 1 shows a block diagram of an example of an apparatus 12 to process video content. In the illustrated example, the apparatus 12 includes an operating system 14, memory 16, platform hardware 18, and a display 34. The apparatus 12 may include any platform such as a laptop, personal digital assistant (PDA), wireless smart phone, media content player, imaging device, mobile Internet device (MID), any smart device such as a smart phone, smart tablet, smart TV, an electronic writing pad, projector, and so on, or combinations thereof.

In the illustrated example, the operating system 14 includes a user mode driver (UMD) 20 that may receive a request to process video content. The video content may include one or more video images, frames, streams, portions thereof, and so on, or combinations thereof. The video content may also include one or more formats, such as joint photographic experts group format (JPEG) format, graphics interchange format (GIF), tagged image file format (TIFF), raw image file format (RAW), moving picture experts group format (MPEG), windows media video format (WMV) format, and so on, or combinations thereof. In addition, the video content may originate from any on-platform or off-platform content source, such as a media server, storage, memory, and so on, or combinations thereof.

The request to process the video content may include any signal processing request, such as a request to encode video content, decode video content, compress video content, decompress video content, filter video content, convert video content, display video content, send/receive video content, and so on, or combinations thereof. The UMD 20 may receive the request to process the video content from one or more upper level components. For example, the UMD 20 may receive the request to process the video content from middleware. The UMD 20 may also receive the request to process the video content from a video acceleration (VA) interface, such as DirectX video acceleration (DXVA) interface, a library video acceleration (libVA) interface, and so on, or combinations thereof. In the illustrated example, the UMD 20 may receive the request to process the video content from applications 26, 28, for example through an application programming interface (API).

In response to the request to process the video content, the UMD 20 may locate and/or prepare a command that is associated with the request. As will be discussed in greater detail below, the command may include a hardware command, a data store command, and so on, or combinations thereof. The UMD 20 may also locate and/or prepare one or more resources to be used to answer the request. For example, the UMD 20 may locate the memory 16 to be used to input and/or output a video codec, which may enable compression or decompression of digital video content. In addition, the UMD 20 may locate an available and/or free command buffer. In the illustrated example, the UMD 20 searches a resource table 30 stored in the memory 16 to locate the available and/or free command buffers, and/or other necessary resources for the video content. As will be discussed in greater detail below, the resource table 30 may include a handle array having a valid handle that is associated with an available and/or free command buffer, as well as any other resource that is needed to process the video content.

The UMD 20 may insert the command that is associated with the request into the available and/or free command buffer in response to the request to process the video content. In addition, the UMD 20 may enqueue the command buffer, to receive a further request to process further video content independent of an execution of the command (and/or of the processing of the command buffer) by any platform hardware, such as a graphical processing unit (GPU), visual processing unit (VPU), and so on, or combinations thereof. In the illustrated example, the UMD 20 enqueues the command buffer containing the inserted command(s) to a queue 32 stored in the memory 16. The queue 32 may include any type of buffer, for example as a first-in-first-out (FIFO) buffer. The buffer may be implemented in any configuration, such as a fixed memory location in hardware, a virtual data buffer in software pointing at a location in the physical memory, and so on, or combinations thereof. Accordingly, the UMD 20 does not wait, and is free to immediately return to the upper level components (e.g., to the applications 26, 28, to the middleware, etc.), to receive any further requests to process further video content. Since the UMD) 20 is not dependent on a KMD 22, on the command buffer processing, and/or on the execution of the commands by the platform hardware 18, resource utilization (e.g., CPU utilization, GPU utilization, etc.) is maximized, power is saved, and/or user experience is maximized by relatively higher throughput (e.g., relatively higher FPS).

In the illustrated example, the operating system 14 includes a command submission process (CSP) 24. The CSP 24 may include a process, which may include a sequence of programmed instructions, a daemon, which may include a sequence of programmed instructions that runs as a background process, a thread, which may include the smallest sequence of programmed instructions that can be managed by an operating system (OS) scheduler, and so on, or combinations thereof. The CSP 24 may dequeue the command buffer, for example by retrieving and/or removing the command buffer from the queue 32 and/or the memory 16. In one example, the CSP 24 dequeues the first command buffer that was enqueued by the UMD 20 in a first-in-first-out operation.

In addition, the CSP 24 may make a system call, such as input/output control (IOCTL), directly to the KMD 22. In response to the system call, the KMD 22 may receive the dequeued command buffer containing the command(s) that are associated with the request to process the video content, and submit the command buffer to the platform hardware 18 (e.g., GPU) for processing of the command buffer (e.g., execution of the command). Since the KMD 22 receives the system call independent of the UMD 20, for example through a direct system call from the CSP 24, resource utilization (e.g., CPU utilization, CPU utilization, etc.) is maximized, power is saved, and/or user experience is maximized by relatively higher throughput.

The command that is located and/or prepared by the UMD may include a hardware command, such as an encode/decode command, a display command, and so on, or combinations thereof. The platform hardware 18 (e.g., GPU) may receive the command buffer and execute the hardware command to process the video content. Accordingly, when the video content is a video frame, the platform hardware 18 (e.g., GPU) executes the display hardware command to render the video frame on the display 34. In addition, as will be discussed in greater detail below, the command may include a data store command. The platform hardware 18 (e.g., GPU) may receive the command buffer and execute the data store command to replace an invalid handle in a handle array with a valid handle associated with the newly available and/or free command buffer, and/or other resource related to the video content, in the handle array. Accordingly, the resource table 30 may be immediately updated by the platform hardware 18 (e.g., CPU) with all valid handles that are associated with all available and/or free command buffers, and/or other resources for video content.

Figure 2:
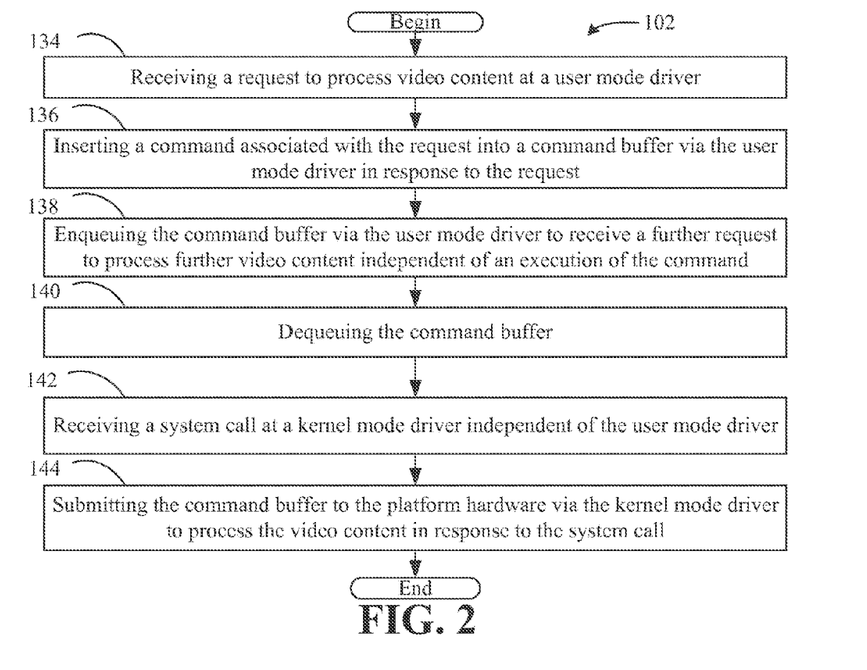
FIG. 2 is a flowchart of an example of a method to process video content in response to a request according to an embodiment.

Turning now to FIG. 2, a flowchart of an example of a method 102 to process video content in response to a request to process video content is illustrated. The method 102 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programnmable gate arrays (FPGAs), complex programable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 102 may be written in any combination of one or more programming languages, including an object oriented programming language such as C++ or the like and conventional procedural programming languages, such as the "C" programming language or similar programming languages. In addition, the method 102 could be implemented using any of the herein mentioned circuit technologies.

Illustrated processing block 134 provides for receiving a request to process video content at a UMD. For example, the request may be received from an upper level component such as a VA interface to encode/decode video content such as a video frame. In response to the request, processing block 136 provides for inserting a command associated with the request into a command buffer via the UMD. For example, the UMD may prepare and/or insert a hardware command such as an encode/decode command and a data store command such as an MI_STORE_DATA_IMM command into the command buffer. The data store command may reference the valid handle associated with the command buffer (e.g., a physical address).

Illustrated processing block 138 provides for enqueing the command buffer via the UMD. For example, the UMD may enqueue the command buffer containing the hardware command(s) and the data store command to a queue, such as a FIFO queue in memory. Accordingly, the UMD does not depend on the submission of the command buffer to a KMD, the submission of the command buffer to the platform hardware, and/or the execution of the command by the platform hardware. The UMD does not wait, and is free to immediately return to the upper level component (e.g., the VA interface), to receive and/or accept a further request to process further video content.

Illustrated processing block 140 provides for dequeuing the command buffer. For example, a CSP such as a thread may retrieve and/or remove the enqueued command buffer from the queue. Illustrated processing block 142 provides for receiving a system call at the KMD independent of the UMD. For example, the CS (e.g., thread) may make a direct system call (e.g., IOCTL) to the KMD. Illustrated processing block 144 provides for submitting the command buffer to the platform hardware via the KMD to process the video content in response to the system call. For example, the KMD may receive the command buffer and submit the command buffer to the platform hardware to process the video content in response to the system call by the CSP, independent of the UMD. Accordingly, the KMD does not depend on the UMD, since the KMD receives system calls directly from the CSP.

Figure 3:
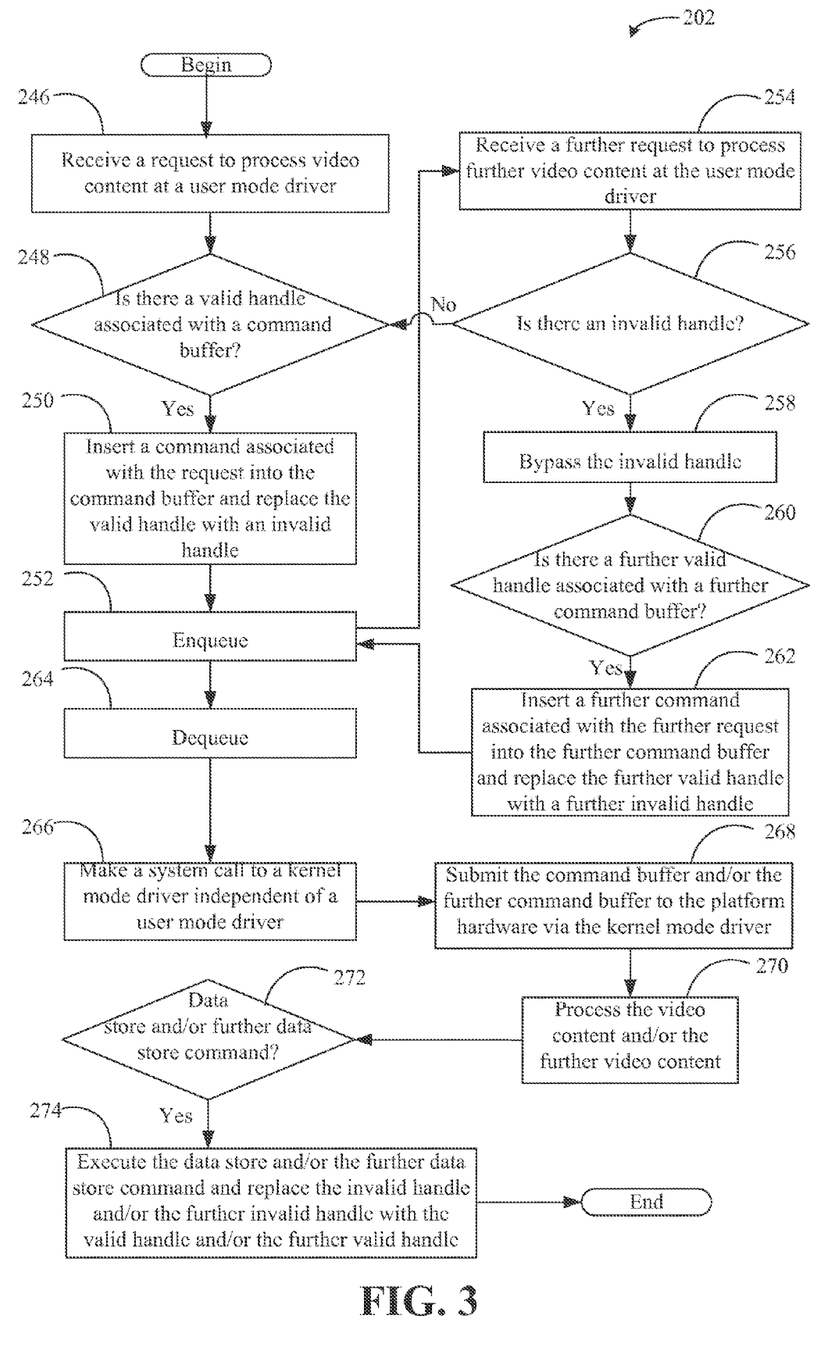
FIG. 3 is a flowchart of an example of a method to process video content in response to a request and a further request according to an embodiment.

FIG. 3 illustrates a flowchart of an example of a method 202 to process video content in response to a request to process video content and to a further request to process further video content. The method 202 could be implemented using any of the herein mentioned technologies. Illustrated processing block 246 provides for receiving a request to process video content at a UMD. For example, the request may be received from an upper level component such as a VA interface to encode/decode video content such as a first video frame.

A determination is made at block 248 if there is a valid handle associated with a command buffer. For example, the UMD may search a handle array to identify if there is a valid handle associated with an available and/or free command buffer, and/or other necessary resource(s) for the video content. If there is no valid handle, the UMD may be forced to wait until a valid handle becomes available. If, on the other hand, there is a valid handle, the UMD inserts a command associated with the request into the command buffer associated with the valid handle and replaces the valid handle with an invalid handle in the handle array at illustrated processing block 250. For example, the UMD may insert a hardware command such as an encode/decode command and a data store command such as an MI_STORE_DATA_IMM command into the command buffer associated with the valid handle, and replace the valid handle with an invalid handle in the handle array. Illustrated processing block 252 provides for an enqueuing operation. For example, the command buffer may be enqueued at the illustrated processing block 252.

Illustrated processing block 254 provides for receiving a further request such as a further encode/decode request to process further video content such as a second video frame (of the same or different video stream) at the UMD. A determination is made if there is an invalid handle in the handle array at processing block 256. If there is no invalid handle, the process may continue to the processing block 248 to determine if there is a valid handle associated with a command buffer in the handle array, such as when the command buffer was used and made newly available. It is apparent, however, that the determination if there is a valid handle and an invalid handle may be made concurrently. If there is an invalid handle, illustrated processing block 258 provides for bypassing the invalid handle in the handle array.

A determination is made at block 260 if there is a further valid handle associated with a further command buffer. If not, the UMD may be forced to wait until a valid handle and/or a further valid handle (e.g., the next valid handle) becomes available. If, on the other hand, there is a further valid handle available, the UMD inserts a further command associated with the further request into the further command buffer and replaces the further valid handle with a further invalid handle in the handle array at illustrated processing block 262. For example, the UMD may insert a further hardware command such as a further encode/decode command and a further data store command such as a further MI_STORE_DATA_IMM command into the further command buffer associated with the further valid handle, and replace the further valid handle with the further invalid handle in the handle array.

The illustrated processing block 252 provides for an enqueuing operation. For example, as previously mentioned, the command buffer containing the command(s) associated with the request to encode/decode the first video frame may be enqueued (e.g., submitted) by the UMD to a queue. Accordingly, the UMD does not wait, and is free to immediately return to the upper level component (e.g., the VA interface), to receive and/or accept the further request to process further video content. Therefore, the UMD is available to receive the further request from the upper level component (e.g., the VA interface) to encode/decode the second frame as a result of the submission of the command buffer to the queue (e.g., the enqueue), independent of the execution of the command(s) to process the first frame. In addition, the further command buffer containing the command(s) associated with the further request to encode/decode the second video frame may be enqueued (e.g., submitted) by the UMD) to the queue to enable the UMD to immediately return to the upper level component to receive and/or accept any further requests to process further video content (e.g., another request to encode/decode a third video frame, etc.).

Illustrated processing block 264 provides for a dequeuing operation. For example, a CSP such as a thread may retrieve and/or remove the enqueued command buffer and/or the enqueued further command buffer from the queue. When the queue includes a FIFO buffer, the CSP may retrieve and/or remove the command buffer before the further command buffer. Illustrated processing block 266 provides for making a system call to a KMD independent of the UMD. For example, the CSP (e.g., thread) may make the system call (e.g., IOCTL) directly to the KMD. Illustrated processing block 268 provides for submitting the command buffer and/or the further command buffer to the platform hardware via the KMD to process the video content in response to the system call. For example, the KMD may receive the command buffer and/or the further command buffer, and submit them to the platform hardware to process the video content (e.g., the first video frame, the second video frame, etc.) in response to respective system calls by the CSP.

Illustrated processing block 270 provides for processing the video content. For example, when the command buffer and/or the further command buffer includes a hardware command such as a decode command, the platform hardware (e.g., GPU) receives the respective command buffers from the KMD and executes their respective commands to process the respective video content. Accordingly, the platform hardware (e.g., GPU) receives the command buffer from the KMD and executes the hardware command to decode the first video frame, receives the further command buffer from the KMD and executes the further hardware command to decode the second video frame, and so on, or combinations thereof.

A determination is made at block 272 if the command and/or the further command in the command buffer includes a data store command such as a MI_STORE_DATA_IMM command and/or a further data store command such as a further MI_STORE_DATA_IMM command. If so, illustrated processing block 274 provides for executing the respective data store commands and replacing the respective invalid handles with their respective valid handles in the handle array.

Figure 4:
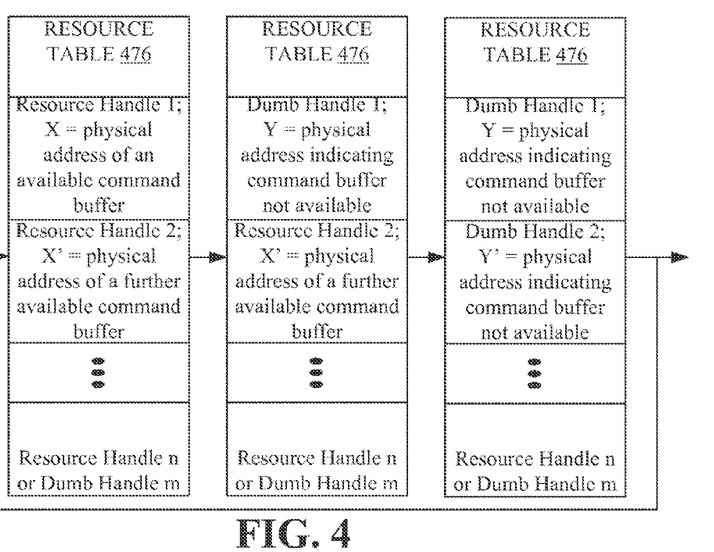
FIG. 4 is an example of a block diagram of a resource handle array according to an embodiment.

Turning now to FIG. 4, an example of a block diagram of a resource table 476 is illustrated. The resource table 476 may be located at any component and/or stage of a platform, such as at storage, memory, a processor, an operating system, and so on, or combinations thereof. The resource table 476 may include one or more valid handles that are associated with an available and/or free command buffer, as well as any other resource that is needed to process the video content. The resource table 476 may include a handle array, such as a matrix (e.g., 2D matrix). For example, resources may be allocated and/or stored in a resource pool (RP) handle array when a video device is created. The maximum number of resources may be pre-set in the RP handle array. In addition, a further handle array, such as a resource-in-use (RiU) handle array, may be generated as a duplicate of the RP handle array.

In the illustrated example, the resource table 476 includes a valid handle (e.g., Resource Handle) having an identifier, denoted by X, that is associated with an available resource (e.g., an available command buffer). The identifier may include a physical address, 32 bit ID, universally unique identifier (UUID), globally unique identifier (GUID), and so on, or combinations thereof. For example, X may be the physical address of the available command buffer. In addition, the resource table 476 includes an index location, denoted by 1, 2, . . . n, to provide the location of the valid handle (e.g., Resource Handle at index location 1) in the resource table 476. Accordingly, the resource table 476 includes the identifiers X, X', etc. and the index locations 1, 2, . . . n for each of the plurality of valid handles.

The UMD may receive a request to process video content and, in response to the request, insert a command associated with the request into the command buffer. For example, the UMD searches the resource table 476 to identify the first valid handle (e.g., Resource Handle at index location 1 having the identifier X) that is associated with a free and/or available command buffer, and/or other necessary resource(s) for the video content. The UMD replaces the valid handle having the identifier X at the corresponding index position 1 in the resource table 476 with an invalid handle (e.g., Dumb Handle at index location 1). The invalid handle includes the identifier Y, and signals to the UMD that the resource is not available. The identifiers Y, Y', etc. may include a physical address, 32 bit ID, universally unique identifier (UUID), globally unique identifier (GUID), and so on, or combinations thereof. For example, the identifier Y may be pre-defined, such as all "0", all "1", ffffffff hex format of a 32 bit ID, and so on, or combinations thereof. Accordingly, the valid handle may be recognized by the UMD by having any identifier other than the pre-defined invalid handle identifier in the resource table 476.

The UMD inserts the command(s) associated with the request into the command buffer associated with the valid handle (e.g., Resource Handle 1 having the identifier X). In addition, the UMD enqueues the command buffer to receive a further request to process further video content independent of an execution of the command by platform hardware. For example, in response to the further request, the UMD searches the resource table 476 as before and may encounter the invalid handle (e.g., Dumb Handle 1), since the command buffer that was enqueued may not be free and/or available (e.g., the platform hardware has not processed the command buffer associated with the Resource Handle 1). Accordingly, the UMD bypasses the invalid handle (e.g., Dumb Handle 1) and encounters the next available and/or free valid handle (e.g., Resource Handle at index location 2 having the identifier X'). The UMD replaces the valid handle having the identifier X' with an invalid handle having an identifier Y' at the index location 2 (e.g., Dumb Handle 2).

The UMD inserts a further command associated with the further request into a further command buffer associated with the further valid handle (e.g., Resource Handle 2). In addition, the UMD enqueues the further command buffer to receive yet a further request to process yet further video content. In response to the further request (e.g., a third request), the UMD searches the resource table 476 and may encounter the invalid handles (e.g., Dumb Handle 1, Dumb Handle 2, etc.) until the next available and/or free valid handle is reached. At any time, however, the UMD may also encounter a newly available and/or free valid handle in the resource table 476. For example, when the platform hardware executes the commands inserted into the command buffer associated with the valid handle having the identifier X, the platform hardware may be instructed to overwrite the invalid handle (e.g., identifier Y) in the resource table 472 with the valid handle (e.g., identifier X) associated with the command buffer. Accordingly, the command buffer is newly available (e.g., Resource Handle 1 having the identifier X) to the UMD and may be used for any further request to process video content.

Figure 5:
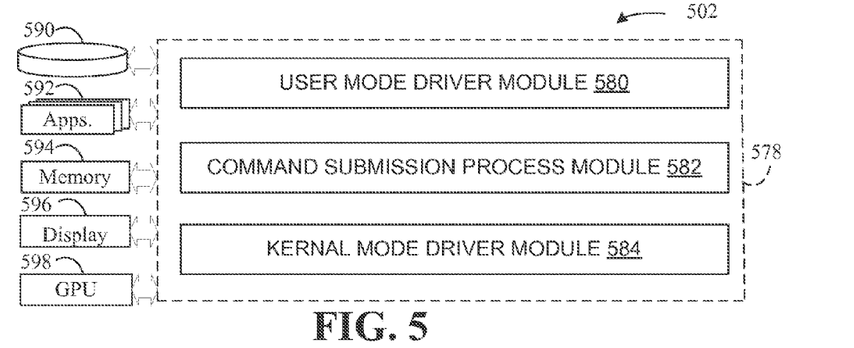
FIG. 5 is an example of a block diagram of a logic architecture according to an embodiment.

FIG. 5 is an example of a block diagram of a system 502 including a logic architecture 578 to process video content. The logic architecture 578 may be generally incorporated into a platform such as such as a laptop, PDA, wireless smart phone, media player, imaging device, mobile Internet device (MID), any smart device such as a smart phone, smart tablet, smart TV, an electronic writing pad, projector, and so on, or combinations thereof. The logic architecture 578 may be implemented in an application, operating system, media framework, hardware component, or combinations thereof. The logic architecture 578 may be implemented in any system component, such as a network interface component, memory, processor, hard drive, operating system, application, and so on, or combinations thereof. For example, the logic architecture 578 may be implemented in a processor, such as central processing unit (CPU), a graphical processing unit (GPU), a visual processing unit (VPU), a sensor, an operating system, an application, and so on, or combinations thereof.

In the illustrated example, the system 502 includes storage 590, applications 592, memory 594, a display 596, and a GPU 598. It is apparent, however, that the system 502 may include any other components such as a power source (e.g., a battery, a power connector, etc.), communications interfaces (e.g., a network interface card), and so on, or combinations thereof.

In the illustrated example, the logic architecture 578 includes a UMD module 580 to receive a request to process video content. The UMD module 580 may insert a command associated with the request into a command buffer in response to the request. In addition, the UMD module 580 may enqueue the command buffer to receive a further request to process further video content independent of an execution of the command by the platform hardware. The UMD module 580 may enqueue the command buffer upon notification that a queue is being emptied, is emptied, is emptied at a pre-determined threshold value, is not full, and so on, or combinations thereof. For example, the UMD module 580 may provide the following operations:

```
{
Prepare CMDs...
Get_CMD_Resource;
Add_CMD_to_Buf;
EnQueue for CMD Submission;
}
```

The UMD module 580 may identify a valid handle associated with the command buffer in a handle array and replace the valid handle with an invalid handle in the handle array. For example, the UMD module 580 may provide the following operations:

```
Get_CMD_Resource {
Search with spin wait the first valid handle X in RiU;
Replace the X with a Dumb handle;
}
```

The UMD module 580 may insert a hardware command to be executed by the platform hardware to process the video content. In addition, the UMD module 580 may insert a data store command to be executed by the platform hardware to replace an invalid handle in a handle array with a valid handle associated with the command buffer in the handle array. For example, the UMD module 580 may provide the following operations:

```
Add_CMD_to_Buf {
Insert prepared commands to command buffer with handle X;
MiStoreDataImmCmdParam.GfxAddress = X location in Riu;
MiStoreDataImmCmdParam.DataLowPart = X;
Insert MI_STORE_DATA_IMM to command buffer with handle X;
}
```

In the illustrated example, the logic architecture 578 includes a CSP module 582. The CSP module 582 may dequeue the command buffer. For example, the CSP module 582 may dequeue the command buffer upon notification that a queue is being filled, is filled, is filled at a pre-determined threshold value, is not empty and so on, or combinations thereof. The CSP module 582 may include a process, a daemon, a thread, and so on, or combinations thereof. In addition, the CSP module 582 may call a KMD module 584 to submit the command buffer to the platform hardware to execute the command. For example, the CSP module 582 may provide the following operations:

```
{
DeQueue upon notification;
Call KMD for CMD Submission;
}
```

While examples have illustrated separate modules, it is apparent that one or more of the modules of the logic architecture 578 may be implemented in one or more combined modules.

Figure 6:
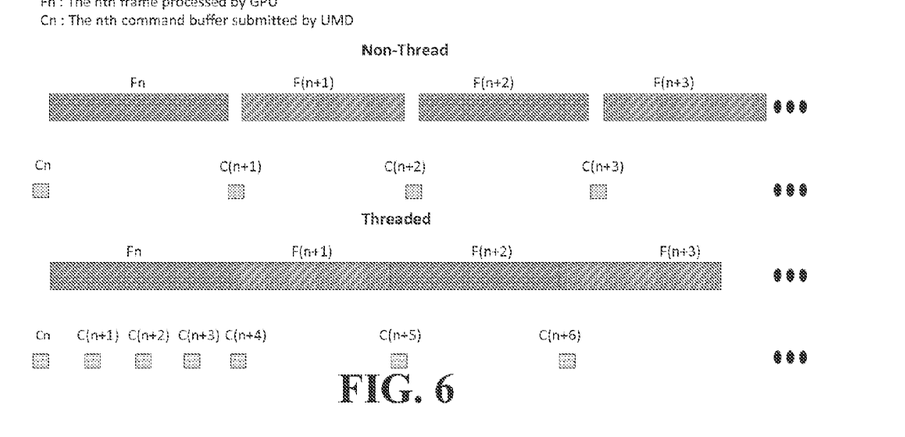
FIG. 6 is a block diagram of an example of a flow where command buffers are submitted by a user mode driver (UMD) and where video frames are processed by platform hardware (e.g. GPU) according to an embodiment.

Turning now to FIG. 6, a block diagram of an example of a flow where command buffers are submitted by a UMD and where video frames are processed by platform hardware (e.g. GPU) is illustrated. In the non-threaded example, command buffers Cn are submitted by the UMD and video frames are processed by the platform hardware (e.g., GPU) in a sequential manner. For example, the UMD receives a request to process video content (e.g., a video frame Fn). In response, UMD finds one or more hardware commands associated with the request to process the video frame Fn, the command buffer Cn, and inserts the hardware commands into the command buffer Cn. The command buffer Cn is submitted to the platform hardware (e.g., GPU) via a direct system call by the UMD to the KMD (e.g., using IOCTL) to process the video frame Fn. The UMD cannot return to receive a further request from the upper level component (e.g., middleware) to process a further video frame F(n+1) until the platform hardware processes the video frame Fn.

When the video frame Fn is processed, the CPU notifies a CPU and the UMD is able to return to receive the further request from the upper level component, find further hardware commands associated with the further request, find a further command buffer C(n+1), and submit the further command buffer C(n+1) to the platform hardware (e.g., GPU) via a direct system call by the UMD to the KMD to process the video frame F(n+1), and so on. Accordingly, a delay/gap between two adjacent platform hardware activities (e.g., GPU activities) is created, which in turns minimizes the efficiency of the platform. Moreover, since a direct call is made to the KMD from the UMD, use of the platform hardware (e.g., GPU) cannot be configured according to a preference.

In the threaded example, multiple command buffers are available to the UMD, the command buffers that are used may be enqueued by the UMD, the command buffers may be submitted to the platform hardware (e.g., CPU) to process video frames independent of a system call by the UMD, the command buffers that are used may be made available to the UMD relatively soon after the platform hardware (e.g., CPU) processes the command buffers, and so on, or combinations thereof. For example, the UMD receives a request to process video content (e.g., a video frame Fn). In response, the UMD finds one or more hardware commands associated with the request to process the video frame Fn, a data store command, the command buffer Cu, and inserts the commands into the command buffer Cn. The UMD enqueues the command buffer Cn and returns to receive a further request from the upper level component to process further video content (e.g., the video frame F(n+1)). The command buffer Cn is dequeued by a submission daemon and is submitted to the platform hardware (e.g., GPU) via a system call by the submission daemon to KMD (e.g., using IOCTL).

The UMD receives the further request to process the further video content (e.g., the further frame F(n+1)), finds one or more hardware commands associated with the further request, a further command buffer C(n+1) (or a newly available command buffer), finds a further data store command, inserts the commands into the command buffer C(n+1) (or the newly available command buffer), enqueues the command buffer C(n+1) (or the newly available command buffer), and returns to the upper level component. Accordingly, the UMD is able to receive any further requests from the upper level component independent of whether processing of the command buffer Cn has started, is in progress, and/or is completed.

In addition, the further command buffer C(n+1) (or the used and newly available command buffer) is submitted to the platform hardware (e.g., CPU) via the KMD by a system call (e.g., IOCTL) directly made from the submission daemon and not KMD. Accordingly, it is possible to configure the use of the platform hardware (e.g., the GPU) according to a preference since the system call to the KMD is not made directly by the UMD), but is instead made from the submission daemon independent of the UMD. In the illustrated example, a plurality of command buffers are submitted to the platform hardware independent of whether processing of the command buffer Cn has started, is in progress, and/or is completed. Accordingly, delay is minimized, video quality is maximized, and the user of resources is maximized. For example, any delay/gap between two adjacent platform hardware activities (e.g., GPU activities) is substantially closed, which in turn maximizes the efficiency of the platform.

Although not shown, the further command buffer identified by the UMD in response to the further request (e.g., to process further video frame F(n+1) may be Cn, which has been used and made newly available to the UMD by the platform hardware (e.g., GPU). For example, in response to the request to process video content (e.g., to process the video frame Fn) from the upper level component, UMD may find a valid handle (e.g., physical address) in a resource table (e.g., RiU handle array) that is associated with an available resource (e.g., available command buffer Cn) and use it to respond to the request. The UMD may replace the valid handle associated with the command buffer Cn in the resource table with an invalid handle (e.g., a pre-set physical address) at the index location that the valid handle is located (e.g., 1, 2, . . . n). The invalid handle signals to the UMD that the resource (e.g., command buffer) is not available.

If the UMD receives the further request to process the further video content (e.g., to process the further video frame F(n+1)) before the platform hardware (e.g., CPU) processes the command buffer Cn (e.g., before CPU executes the commands in the command buffer Cn), then the UMD will encounter the invalid handle in the handle array. The UMD will bypass (e.g., skip and/or ignore) the invalid handle, and find the next valid handle (e.g., physical address associated with the command buffer C(n+1)) to use for the further request. If, however, the platform hardware (e.g., GPU) processes the command buffer Cn and executes the corresponding data store command, the platform hardware (e.g., CPU) will directly interface with the handle array by replacing the invalid handle with the valid handle (e.g., physical address) associated with the command buffer Cn. Accordingly, if the UMD receives and/or responds to the further request after the platform hardware (e.g., CPU) processes the command buffer Cn, the UMD may encounter the valid handle associated with the used and newly available command buffer Cn. As presented above, UMD may again replace the valid handle associated with the command buffer Cn with an invalid handle in the handle array at the corresponding index location.

Figure 7:
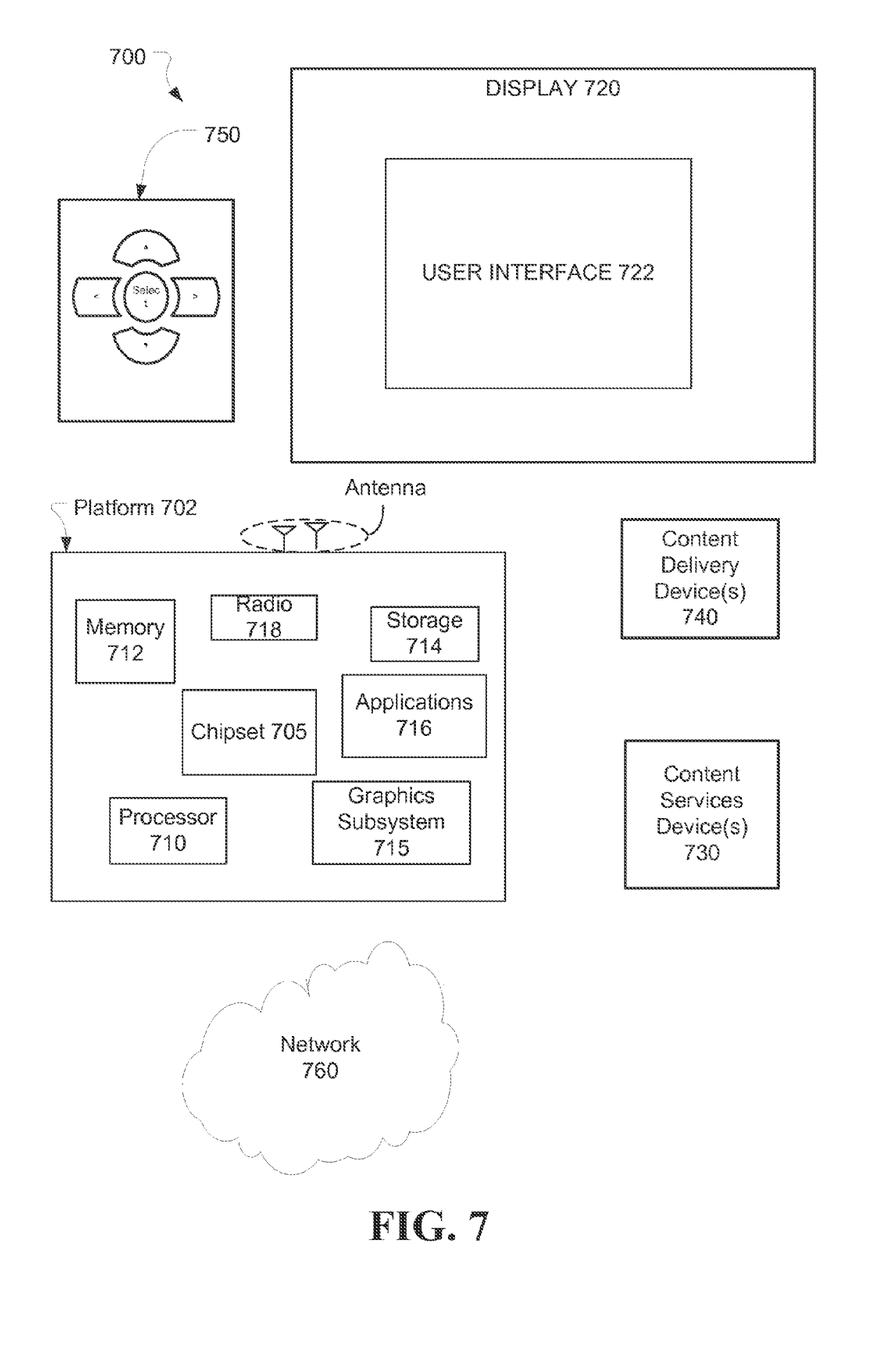
FIG. 7 is a block diagram of an example of a system including a user mode driver, a kernel mode driver, and/or a command submission process according to an embodiment.

FIG. 7 illustrates an embodiment of a system 700 that may implement logic to process video content. The logic may include the UMD 20 (FIG. 1), the KMD 22 (FIG. 1), the CSP 24 (FIG. 1), and/or the logic architecture 578 (FIG. 5), previously discussed. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
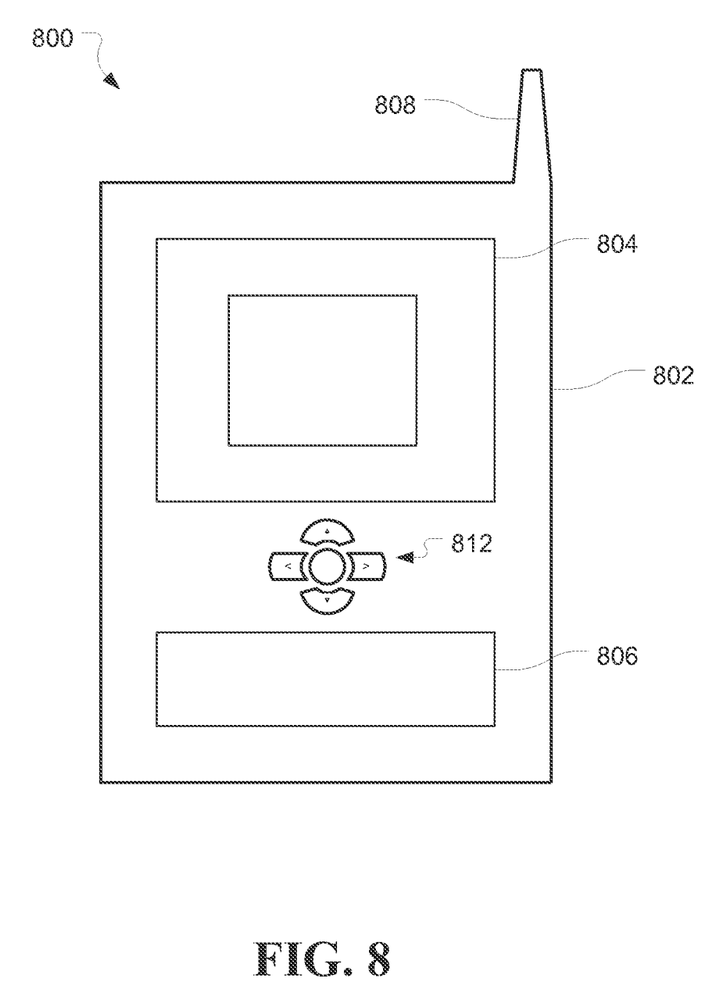
FIG. 8 is a block diagram of an example of a system having a small form factor according to an embodiment.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Embodiments may include an apparatus to process video content. The apparatus may include a user mode driver to receive a request to process video content. The user mode driver may insert a command associated with the request into a command buffer in response to the request. The user mode driver may enqueue the command buffer to receive a further request to process further video content independent of an execution of the command by platform hardware.

Additionally, the user mode driver may identify a valid handle associated with the command buffer, and/or any other resource needed to process the video content, in a handle array and replace the valid handle with an invalid handle in the handle array. In addition, the user mode driver may bypass the invalid handle in response to the further request, for example if the execution of the command is not complete and/or the command buffer is not available.

Additionally, the user mode driver may insert a further command associated with the further request into a further command buffer. In addition, the user mode driver may bypass the invalid handle in the handle array and identify a further valid handle associated with the further command buffer, and/or any other resource needed to process the video content, in the handle array to insert the further command associated with the further request into the further command buffer. In addition, the user mode driver may bypass the invalid handle and/or identify the further valid handle to insert the further command into the further command buffer if, for example, the execution of the command is not complete and/or the command buffer is not available.

Additionally, the user mode driver may insert the further command associated with the further request into the command buffer, for example if the execution of a data store command is completed and/or the command buffer is available.

Additionally, the command and/or the further command may include a hardware command to be executed by the platform hardware to process the video content. In addition, the command and/or the further command may include a data store command to be executed by the platform hardware to replace an invalid handle in a handle array with a valid handle associated with the command buffer, or any other resource needed to process the video content, in the handle array.

Additionally, the apparatus may include memory to store one or more command buffers, further command buffers, and so on, or combinations thereof. In addition, the apparatus may include a command submission process to dequeue the command buffer, for example from memory. In addition, the command submission process may call a kernel mode driver module to submit the command buffer to the platform hardware to execute the command. In addition, the command submission daemon may include one or more of a process, a daemon, and a thread.

Additionally, the apparatus may include a kernel mode driver to receive a system call independent of the user mode driver and submit the command buffer to the platform hardware to process the video content in response to the system call.

Embodiments may also include a computer-implemented method to process video content. The method may include receiving a request to process video content at a user mode driver. In addition, the method may include inserting a command associated with the request into a command buffer via the user mode driver in response to the request. In addition, the method may include enqueuing the command buffer via the user mode driver to receive a further request to process further video content independent of an execution of the command by platform hardware.

Additionally, the method may include identifying a valid handle associated with the command buffer in a handle array, and/or any other resource needed to process the video content, and replacing the valid handle with an invalid handle in the handle array. In addition, the method may include bypassing the invalid handle in response to the further request, for example if the execution of the command is not completed and/or the command buffer is not available.

Additionally, the method may include inserting a further command associated with the further request into a further command buffer. In addition, the method may include inserting the further command into the further command buffer by bypassing the invalid handle in the handle array and identifying a further valid handle associated with the further command buffer, and/or any other resource needed to process the video content. In addition, the method may include bypassing the invalid handle and/or identifying the further valid handle to insert the further command if for example, the execution of the command is not completed and/or the command buffer is not available.

Additionally, the method may include inserting the further command associated with the further request into the command buffer, for example if the execution of the data store command is completed and/or the command buffer is available.

Additionally, the method may include inserting a hardware command to be executed by the platform hardware to process the video content. In addition, the method may include inserting a data store command to be executed by the platform hardware to replace an invalid handle in a handle array with a valid handle associated with the command buffer, and/or any other resource needed to process the video content, in the handle array.

Additionally, the method may include dequeuing the command buffer by one or more of retrieving and removing the command buffer from memory. In addition, one or more of a process, a daemon, and a thread may be implemented to accomplish the dequeuing.

Additionally, the method may include receiving a system call at a kernel mode driver independent of the user mode driver. In addition, the method may include submitting the command buffer to the platform hardware via the kernel mode driver to process the video content in response to the system call.

Embodiments may also include a computer-readable medium having a set of instructions, which, if executed by a processor, may cause a processor to process video content. In addition, the instructions, if executed, may cause a processor to receive a request to process video content at a user mode driver. In addition, the instructions, if executed, may cause a processor to insert a command associated with the request into a command buffer via the user mode driver in response to the request. In addition, the instructions, if executed, may cause a processor to enqueue the command buffer via the user mode driver to receive a further request to process further video content independent of an execution of the command by platform hardware.

Additionally, the instructions, if executed, may cause a processor to identify a valid handle associated with the command buffer, and/or any other resource needed to process the video content, in a handle array and replace the valid handle with an invalid handle in the handle array. In addition, the instructions, if executed, may cause a processor to enable the user mode driver to bypass the invalid handle in response to the further request, for example if the execution of the command is not complete and/or the command buffer is not available.

Additionally, the instructions, if executed, may cause a processor to insert a further command associated with the further request into a further command buffer. In addition, the instructions, if executed, may cause a processor to bypass an invalid handle in a handle array and identify a further valid handle associated with a further command buffer, and/or any other resource needed to process the video content, to insert the further command associated with the further request into the further command buffer. In addition, instructions, if executed, may cause a processor to bypass the invalid handle and/or identify the further valid handle to insert the further command if, for example, the execution of the command is not complete and/or the command buffer is not available.

Additionally, the instructions, if executed, may cause a processor to insert the further command associated with the further request into the command buffer, for example if the execution of a data store command is completed and/or the command buffer is available.

Additionally, the instructions, if executed, may cause a processor to insert a hardware command to be executed by the platform hardware to process the video content. In addition, the instructions, if executed, may cause a processor to insert and a data store command to be executed by the platform hardware to replace an invalid handle a handle array with a valid handle associated with the command buffer or any other resource needed to process the video content, in the handle array.

Additionally, the instructions, if executed, may cause a processor to dequeue the command buffer, for example from memory. In addition, the instructions, if executed, may cause a processor to one or more of retrieve and remove the command buffer from memory. In addition, the instructions, if executed, may cause a processor to implement one or more of a process, a daemon, and a thread to dequeue the command buffer.

Additionally, the instructions, if executed, may cause a processor to receive a system call at a kernel mode driver independent of the user mode driver. In addition, the instructions, if executed, may cause a processor to submit the command buffer to the platform hardware via the kernel mode driver to process the video content in response to the system call.

Embodiments may also include a system having logic to process video content, in combination with one or more system components, such as a power supply, a user interface, image capture system, memory, network interface component, a projector, an application, middleware, an operating system, and so on, or combinations thereof. Moreover, the system may include a display to present the video content. Further, the system may include platform hardware, such as a graphical processing unit (GPU), visual processing unit (VPU), a display, memory, a power supply, and so on, or combinations thereof.

Additionally, the system may include a user mode driver module to receive a request to process video content. The user mode module may insert a command associated with the request into a command buffer in response to the request. The user mode driver module may enqueue the command buffer to receive a further request to process further video content independent of an execution of the command by the platform hardware.

Additionally, the user mode driver module may identify a valid handle associated with the command buffer, and/or any other resource needed to process the video content, in a handle array and replace the valid handle with an invalid handle in the handle array. In addition, the user mode driver module may bypass the invalid handle in response to the further request, for example if the execution of the command is not complete and/or the command buffer is not available.

Additionally, the user mode driver module may insert a further command associated with the further request into a further command buffer. In addition, the user mode driver module may bypass the invalid handle in the handle array and identify a further valid handle associated with the further command buffer, and/or any other resource needed to process the video content, in the handle array to insert the further command associated with the further request into the further command buffer. In addition, the user mode driver module may bypass the invalid handle and/or identify the further valid handle to insert the further command if, for example, the execution of the command is not complete and/or the command buffer is not available.

Additionally, the user mode driver module may insert the further command associated with the further request into the command buffer, for example if the execution of a data store command is completed and/or the command buffer is available.

Additionally, the command and/or the further command may include a hardware command to be executed by the platform hardware to process the video content. In addition, the command and/or the further command may include a data store command to be executed by the platform hardware to replace an invalid handle in a handle array with a valid handle associated with the command buffer, or any other resource needed to process the video content, in the handle array.

Additionally, the system may include memory to store one or more command buffers, further command buffers, and so on, or combinations thereof. In addition, the system may include a command submission process module to dequeue the command buffer, for example from memory. The command submission process module may call a kernel mode driver module to submit the command buffer to the platform hardware to execute the command. In addition, the command submission process module may include one or more of a process, a daemon, and a thread.

Additionally, the system may include a kernel mode driver module to receive a system call independent of the user mode driver and submit the command buffer to the platform hardware to process the video content in response to the system call.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
platform hardware to process video content;
a user mode driver to:
  receive a request to process the video content from an upper level component;
  insert a command associated with the request into a command buffer in response to the request;
  enqueue the command buffer;
  return to the upper level component after the enqueue by the user mode driver to receive a further request to process further video content, wherein the return is independent of any operation by a kernel mode driver that submits the command buffer to the platform hardware and is implemented without waiting for the kernel mode driver to process the command including to submit the command buffer to the platform hardware to execute the command;
  insert a further command associated with the further request into a further command buffer in response to the further request; and
  enqueue the further command buffer; and
memory to store the command buffer and the further command buffer.

2. The system of claim 1, wherein the user mode driver is to:
identify a valid handle associated with the command buffer in a handle array;
replace the valid handle associated with the command buffer with an invalid handle in the handle array that is to indicate the command buffer is to be unavailable;
bypass the invalid handle in response to the further request;
identify a valid handle associated with the further command buffer in the handle array; and
replace the valid handle associated with the further command buffer with an invalid handle in the handle array that is to indicate the further command buffer is to be unavailable.

3. The system of claim 1, wherein the user mode driver is to:
insert a hardware command into the command buffer to be executed by the platform hardware to process the video content; and
insert a data store command into the command buffer to be executed by the platform hardware to replace an invalid handle in a handle array with a valid handle associated with the command buffer in the handle array that is to indicate the command buffer is to be newly available.

4. The system of claim 1, further including a command submission process to:
dequeue the command buffer from the memory;
call the kernel mode driver to submit the command buffer to the platform hardware to execute the command;
dequeue the further command buffer from the memory; and
call the kernel mode driver to submit the further command buffer to the platform hardware to execute the further command.

5. The system of claim 4, wherein the command submission process is to include one or more of a process, a daemon, and a thread.

6. The system of claim 1, wherein the kernel mode driver is to:
receive a first system call and a second system call independent of the user mode driver; and
submit the command buffer to the platform hardware to process the video content in response to the first system call and the further command buffer to the platform hardware to process the further video content in response to second system call.

7. A method comprising:
receiving a request to process video content at a user mode driver from an upper level component;
inserting a command associated with the request into a command buffer via the user mode driver in response to the request;
enqueuing the command buffer via the user mode driver;
returning the user mode driver to the upper level component after the enqueuing via the user mode driver to receive a further request to process further video content, wherein the returning is independent of any operation by a kernel mode driver that submits the command buffer to platform hardware and is implemented without waiting for the kernel mode driver to process the command including to submit the command buffer to the platform hardware to execute;
inserting a further command associated with the further request into a further command buffer via the user mode driver in response to the further request; and
enqueuing the further command buffer via the user mode driver.

8. The method of claim 7, further including:
identifying a valid handle associated with the command buffer in a handle array;
replacing the valid handle associated with the command buffer with an invalid handle in the handle array that indicates the command buffer is to be unavailable;
bypassing the invalid handle in response to the further request;
identifying a valid handle associated with the further command buffer in the handle array; and
replacing the valid handle associated with the further command buffer with an invalid handle in the handle array that indicates the further command buffer is to be unavailable.

9. The method of claim 7, wherein inserting the command includes one or more of:
inserting a hardware command into the command buffer to be executed by the platform hardware to process the video content; and
inserting a data store command into the command buffer to be executed by the platform hardware to replace an invalid handle in a handle array with a valid handle associated with the command buffer in the handle array that indicates the command buffer is to be newly available.

10. The method of claim 9, wherein the command buffer that is newly available is used as the further command buffer when the data store command is executed by the platform hardware to replace the invalid handle in a handle array with the valid handle.

11. The method of claim 7, further including dequeuing the command buffer by one or more of retrieving and removing the command buffer from memory, wherein one or more of a process, a daemon, and a thread is implemented to accomplish the dequeuing.

12. The method of claim 7, further including:
receiving a first system call and a second system call at the kernel mode driver independent of the user mode driver; and
submitting the command buffer to the platform hardware via the kernel mode driver to process the video content in response to the first system call and the further command buffer to the platform hardware via the kernel mode driver to process the further video content in response to the second system call.

13. A computer-readable medium comprising one or more instructions that when executed on a processor cause the processor to:
receive a request to process video content at a user mode driver from an upper level component;
insert a command associated with the request into a command buffer via the user mode driver in response to the request;
enqueue the command buffer via the user mode driver;
return the user mode driver to the upper level component after the enqueue via the user mode driver to receive a further request to process further video content, wherein the return is independent of any operation by a kernel mode driver that submits the command buffer to platform hardware and is implemented without waiting for the kernel mode driver to process the command including to submit the command buffer to the platform hardware to execute the command;
insert a further command associated with the further request into a further command buffer via the user mode driver in response to the further request; and
enqueue the further command buffer via the user mode driver.

14. The medium of claim 13, wherein when executed the one or more instructions cause a processor to:
identify a valid handle associated with the command buffer in a handle array;
replace the valid handle associated with the command buffer with an invalid handle in the handle array that is to indicate the command buffer is to be unavailable;
bypass the invalid handle in response to the further request;
identify a valid handle associated with the further command buffer in the handle array; and
replace the valid handle associated with the further command buffer with an invalid handle in the handle array that is to indicate the further command buffer is to be unavailable.

15. The medium of claim 13, wherein when executed the one or more instructions cause a processor to:
insert a hardware command into the command buffer to be executed by the platform hardware to process the video content; and
insert a data store command into the command buffer to be executed by the platform hardware to replace an invalid handle in a handle array with a valid handle associated with the command buffer in the handle array that is to indicate the command buffer is to be newly available.

16. The medium of claim 13, wherein when executed the one or more instructions cause a processor to dequeue the command buffer, wherein the dequeue is to include one or more of a retrieve and a remove operation for the command buffer from memory.

17. The medium of claim 16, wherein when executed the one or more instructions cause a processor to implement one or more of a process, a daemon, and a thread to dequeue the command buffer.

18. The medium of claim 13, wherein when executed the one or more instructions cause a processor to:
receive a first system call and a second system call at the kernel mode driver independent of the user mode driver; and
submit the command buffer to the platform hardware via the kernel mode driver to process the video content in response to the first system call and the further command buffer to the platform hardware to process the further video content in response to second system call.

19. An apparatus comprising:
a user mode driver to:
receive a request to process video content from an upper level component;
insert a command associated with the request into a command buffer in response to the request;
enqueue the command buffer;
return to the upper level component after the enqueue by the user mode driver to receive a further request to process further video content, wherein the return is independent of any operation, after the enqueue, by a kernel mode driver that submits the command buffer to platform hardware and is implemented without waiting for the kernel mode driver to process the command including to submit the command buffer to the platform hardware to execute the command;
insert a further command associated with the further request into a further command buffer in response to the further request; and
enqueue the further command buffer; and
memory to store the command buffer and the further command buffer.

20. The apparatus of claim 19, wherein the user mode driver is to:
identify a valid handle associated with the command buffer in a handle array;
replace the valid handle associated with the command buffer with an invalid handle in the handle array that is to indicate the command buffer is to be unavailable;
bypass the invalid handle in response to the further request;
identify a valid handle associated with the further command buffer in the handle array; and
replace the valid handle associated with the further command buffer with an invalid handle in the handle array that is to indicate the further command buffer is to be unavailable.

21. The apparatus of claim 20, wherein the user mode driver is to:
identify a first available valid handle as the valid handle associated with the command buffer in the handle array to use the command buffer; and
identify a next available valid handle as the valid handle associated with the further command buffer in the handle array to use the further command buffer.

22. The apparatus of claim 19, wherein the user mode driver is to:
insert a hardware command into the command buffer to be executed by the platform hardware to process the video content; and
insert a data store command into the command buffer to be executed by the platform hardware to replace an invalid handle in a handle array with a valid handle associated with the command buffer in the handle array that is to indicate the command buffer is to be newly available.

23. The apparatus of claim 19, further including a command submission process to:
   dequeue the command buffer from the memory; and
   call the kernel mode driver to submit the command buffer to the platform hardware to execute the command.

24. The apparatus of claim 23, wherein the command submission process is to include one or more of a process, a daemon, and a thread.

25. The apparatus of claim 19, wherein the kernel mode driver is to:
   receive a first system call and a second system call independent of the user mode driver; and
   submit the command buffer to the platform hardware to process the video content in response to the first system call and the further command buffer to the platform hardware to process the further video content in response to second system call.

26. The apparatus of claim 19, wherein the video content is to include a video frame of a video and the further video content is to include a further video frame of the video.

* * * * *